Sept. 29, 1964 H. C. LALESSE Re. 25,649

TRANSDUCING DEVICE

Original Filed March 9, 1959

INVENTOR
HERMAN CORNELIS LALESSE

BY Frank R. Trifari
AGENT

United States Patent Office

Re. 25,649
Reissued Sept. 29, 1964

25,649

TRANSDUCING DEVICE

Herman Cornelis Laiesse, Emmasingel, Eindhoven, Netherlands, assignor to North American Philips Company, Inc., New York, N.Y., a corporation of Delaware Original No. 3,026,382, dated Mar. 20, 1962, Ser. No. 798,099, Mar. 9, 1959. Application for reissue Oct. 3, 1962, Ser. No. 229,271
Claims priority, application Netherlands, Mar. 8, 1958, 225,662
5 Claims. (Cl. 179—100.41)

Matter enclosed in heavy brackets [ ] appears in the original patent but forms no part of this reissue specification; matter printed in italics indicates the additions made by reissue.

The invention relates to a transducing device for recording or scanning of a groove-shaped recording track, in which two signals of different directions of oscillation are recorded simultaneously, with the aid of a common recording- or scanning-member respectively. The recording- or scanning-member is connected with two independently deformable transducing elements through a coupling member which comprises two parts, each of which is at least substantially sensitive to only one of the two directions of oscillation. The term "coupling member" is herein defined as a connecting body between two transducing elements, this body having the property of being rigid for one direction of oscillation and resilient for the other direction and conversely. Thus, the coupling member, in one case, combines and the other case splits up two kinds of information.

According to the invention the driving force for the recording or scanning device loads the parts of the coupling member only by tensile stress. This has the advantage that no stress due to axial compression occurs in the said parts.

The two signals referred to above may consist of a conventional, acoustical signal and a reverberation signal or instead of a reverberation signal, a signal in which various acoustical effects are provided, for example, echo effects, or else, the two signals may consist of stereophonically associated acoustical signals. One signal may furthermore, contain high tones and the other signal low tones of an acoustical signal sequence, so that in this manner stereophonic reproduction of the original sound image may be obtained. The two signals may, moreover, consist of stereoscopically associated television signals.

Owing to the fact mentioned above, that the parts of the coupling member are not subjected to stress due to axial compression, it is possible to manufacture at least the parts of the coupling member to be subjected to tensile stress from a material having little rigidity, for example, polyvinylchloride, butylrubber, neoprene, rubber, nylon, polystyrene, and the like materials having plastic-elastic properties. This means that, in general, materials may be used, which are more resilient than the materials employed in the known devices. This brings about a simplification in the construction of the transducing device, which simplification involves, inter alia, that the coupling member is manufactured as an integral member, from the elastic material, while, in particular, owing to the considerably greater resilience of the material of the coupling piece, it is possible to arrange the two transducing elements parallel or substantially parallel to each other, so that a very compact transducing device can be obtained.

The invention will be described more fully with reference to the accompanying drawing in which.

Figure 1:
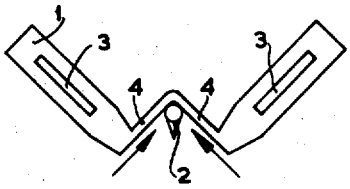
FIG. 1 is a front elevation of the transducing device according to the invention.

Referring to FIG. 1, reference numeral 1 designates the elastic coupling member which establishes a mechanical connection between a recording or a scanning member 2 and the two transducing elements 3. The needle 2, as a scanning member, is subjected to the modulations recorded in the groove of a record disc. If this groove has a composite record, the coupling member will split up the double information, in a manner such that one signal is converted by one transducing element into an electrical voltage and the other signal by the second transducing element. Conversely, when recording two signals of different directions of oscillation, the coupling piece will operate as a composer of the two signals. The parts 4 of the coupling piece, in which the splitting-up or the combination of the information takes place, are subjected, in the device according to the invention, only to tensile stress by the force driving the needle 2. This is due to the fact that the longitudinal axes of the part 4 intersect one another so that an acute angle is formed on the side where the needle is fastened; *i.e. between needle-holder 7 and adjacent portions 4 of the coupling piece.*

Figure 2:
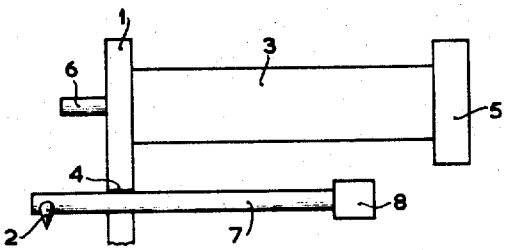
FIG. 2 is a side view thereof.

FIG. 2 is a side view of the transducing device shown in FIG. 1. The transducing element 3 subjected to torsional stress is clamped tight at 5 and is torsioned about the axis 6. The mechanical torque is obtained from the needle holder 7, during the scanning of the groove-shaped recording track, through the coupling member 1, of which the part 4 provided the splitting-up of the information. The needle-holder 7 is suspended at 8 and provided with a needle 2, which can be positioned on the record.

Figure 3:
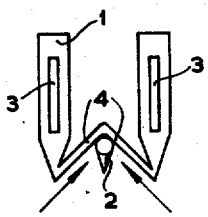
FIG. 3 shows a modification of the device shown in FIGS. 1 and 2 in a more compact construction.

Since the parts 4 are not subjected to stress due to axial compression, they may be manufactured from a material having little rigidity, while a simple construction of the device may be obtained, in which, on the one hand, the coupling piece forms an integral part and, on the other hand, the transducing elements are arranged parallel or substantially parallel to each other, as is shown in FIG. 3.

Apart from the elements that may be subjected to torsional stress, the device may comprise transducing elements that may be subjected to bending stress, though the invention is not confined to the use of piezo-electric transducing elements.

While the invention has been described in connection with specific embodiments, other modifications thereof will be readily apparent to those skilled in the art without departing from the spirit and scope of the invention as defined in the appended claims.

What is claimed is:

[1. A transducing device for converting information recorded in a groove in at least two different directions into a composite signal and for converting a composite signal into two portions recorded in two different directions in a groove comprising a member adapted to follow said groove and selectively record and scan variations therein in both of said directions, a pair of transducing elements each responsive to oscillations corresponding to one of said directions, and a coupling member constituted of a relatively non-rigid material connecting said transducing elements, said coupling member having two portions forming an angle therebetween of less than 90° in which said groove-following member is positioned and connected to said coupling member whereby said coupling member is only under tensile stress and selectively transmits movements of said groove-following member to each of said transducing elements.]

[2. A transducing device for converting information recorded in a groove in at least two different directions into a composite signal and for converting a composite signal into two portions recorded in two different directions in a groove comprising a member adapted to follow said groove and selectively record and scan variations therein in both of said directions, a pair of transducing elements each responsive to oscillations corresponding to one of said directions, and an elastic coupling member constituted of a relatively non-rigid material connecting said transducing elements, said coupling member having two portions forming an angle therebetween of less than 90° in which said groove-following member is positioned and connected to said coupling member whereby said coupling member is only under tensile stress and selectively transmits movements of said groove-following member to each of said transducing elements.]

[3. A transducing device for converting information recorded in a groove in at least two different directions into a composite signal and for converting a composite signal into two portions recorded in two different directions in a groove comprising a member adapted to follow said groove and record and scan variations therein in both of said directions, a pair of transducing elements positioned substantially parallel to one another, each of said transducing elements being responsive to oscillations corresponding to one of said directions, and an elastic coupling member constituted of a relatively non-rigid material connecting said transducing elements, said coupling member having two portions forming an angle therebetween of less than 90° in which said groove-following member is positioned and connected to said coupling member whereby said coupling member is only under tensile stress and selectively transmits movements of said groove-following member to each of said transducing elements.]

[4. A transducing device for converting information recorded in a groove in at least two different directions into a composite signal and for converting a composite signal into two portions recorded in two different directions in a groove comprising a member adapted to follow said groove and selectively record and scan variations therein in both of said directions, a pair of transducing elements each responsive to oscillations corresponding to one of said directions, and an elastic coupling member consisting essentially of polyvinylchloride connecting said transducing elements, said coupling member having two portions forming an angle therebetween of less than 90° in which said groove-following member is positioned and connected to said coupling member whereby said coupling member is only under tensile stress and selectively transmits movements of said groove-following member to each of said transducing elements.]

[5. A transducing device for converting information recorded in a groove in at least two different directions into a composite signal and for converting a composite signal into two portions recorded in two different directions in a groove comprising a member adapted to follow said groove and selectively record and scan variations therein in both of said directions, a pair of transducing elements positioned substantially parallel to one another, each of said transducing elements being responsive to oscillations corresponding to one of said directions, and an elastic coupling member consisting essentially of polyvinylchloride connecting said transducing elements, said coupling member having two portions forming an angle therebetween of less than 90° in which said groove-following member is positioned and connected to said coupling member whereby said coupling member is only under tensile stress and selectively transmits movements of said groove-following member to each of said transducing elements.]

*6. A transducing device for converting information recorded in a groove in at least two different directions into a composite signal and for converting a composite signal into two portions recorded in two different directions in a groove comprising a member adapted to follow said groove and selectively record and scan variations therein in both of said directions, a pair of transducing elements each responsive to oscillations corresponding to one of said directions, and an inverted* V*-shaped member constituted of a relatively non-rigid material connecting said transducing elements, said groove-following member being positioned between the branches of said* V*-shaped member and being connected to the apex thereof whereby the branches of the* V*-shaped member are subjected only to tensile stress by a force on the groove-following member.*

*7. A transducing device for converting information recorded in a groove in at least two different directions into a composite signal and for converting a composite signal into two portions recorded in two different directions in a groove comprising a member adapted to follow said groove and selectively record and scan variations therein in both of said directions, a pair of transducing elements each responsive to oscillations corresponding to one of said directions, and an inverted* V*-shaped elastic member constituted of a relatively non-rigid material connecting said transducing elements, said groove-following member being positioned between the branches of said* V*-shaped member and being connected to the apex thereof whereby the branches of the* V*-shaped member are subjected only to tensile stress by a force on the groove-following member.*

*8. A transducing device for converting information recorded in a groove in at least two different directions into a composite signal and for converting a composite signal into two portions recorded in two different directions in a groove comprising a member adapted to follow said groove and selectively record and scan variations therein in both of said directions, a pair of transducing elements positioned substantially parallel to one another, each of said transducing elements being responsive to oscillations corresponding to one of said directions, and an inverted* V*-shaped elastic member constituted of a relatively non-rigid material connecting said transducing elements, said groove-following member being positioned between the branches of said* V*-shaped member and being connected to the apex thereof whereby the branches of the* V*-shaped member are subjected only to tensile stress by a force on the groove-following member.*

*9. A transducing device for converting information recorded in a groove in at least two different directions into a composite signal and for converting a composite signal into two portions recorded in two different directions in a groove comprising a member adapted to follow said groove and selectively record and scan variations therein in both of said directions, a pair of transducing elements each responsive to oscillations corresponding to one of said directions, and an inverted* V*-shaped elastic member consisting essentially of polyvinylchloride connecting said transducing elements, said groove-following member being positioned between the branches of said* V*-shaped member and being connected to the apex thereof whereby the branches of the* V*-shaped member are subjected only to tensile stress by a force on the groove-following member.*

*10. A transducing device for converting information recorded in a groove in at least two different directions into a composite signal and for converting a composite signal into two portions recorded in two different direc-*

*tions in a groove comprising a member adapted to follow said groove and selectively record and scan variations therein in both of said directions, a pair of transducing elements positioned substantially parallel to one another, each of said transducing elements being responsive to oscillations corresponding to one of said directions, and an inverted* V*-shaped elastic member consisting essentially of polyvinylchloride connecting said transducing elements, said groove-following member being positioned between the branches of said* V*-shaped member and being connected to the apex thereof whereby the branches of the* V*-shaped member are subjected only to tensile stress by a force on the groove-following member.*

References Cited in the file of this patent or the original patent

UNITED STATES PATENTS

| | | |
|---|---|---|
| 2,114,471 | Keller et al. | Apr. 19, 1938 |
| 2,825,763 | De Vries | Mar. 4, 1958 |

FOREIGN PATENTS

| | | |
|---|---|---|
| 686,777 | Great Britain | Jan. 28, 1953 |
| 834,572 | Great Britain | May 11, 1960 |
| T11092 | Germany | Dec. 13, 1956 |